FUEL CONTROLLING DEVICE FOR INJECTION-TYPE COMBUSTION ENGINES
Filed Dec. 29, 1967

United States Patent Office 3,485,223
Patented Dec. 23, 1969

3,485,223
FUEL CONTROLLING DEVICE FOR INJECTION-TYPE COMBUSTION ENGINES
Nobuhiro Kaibara and Yoshimi Sawa, Matsuyama-shi, Takeo Ichikawa, Kawagoe-shi, Risaburo Watanabe, Matsuyama-shi, and Osamu Igarashi, Kawagoe-shi, Japan, assignors to Diesel Kiki Kabushiki Kaisha, Tokyo, Japan, a corporation of Japan
Filed Dec. 29, 1967, Ser. No. 694,721
Int. Cl. F02d 1/02
U.S. Cl. 123—140                    1 Claim

ABSTRACT OF THE DISCLOSURE

A fuel controlling device for injection-type internal combustion engines, wherein fuel controlling members are interlocked with a follower driven by a solid cam, said cam being adapted to reciprocate according to a power piston responding to oil-feed pressure from an oil-feed pump variable with respect to rotational velocity and to effect a rotary motion in response to fluctuating load.

---

This invention relates to a fuel controlling device for injection-type internal combustion engines.

In an internal combustion engine of a fuel injection type, particularly of a gasoline injection-type, the feed of proper amount of fuel should vary with characteristics of the engine and its operational conditions.

Most fuel controlling devices for conventional injection-type internal combustion engines have hitherto employed following methods: one is a method of using a fuel regulating lever or an accelerating pedal in conformity with variation of load and another is one in use of a controlling device operating with load pressure of suction air of an engine to comply with variation in speed of rotation of the engine or a controlling device in employ of a rotary weight under centrifugal force. These controlling means for variation of the rotary speed have used complicated springs or linkages and required the provision of diaphragms and weight of relatively large volume consequent on that the devices could not be made in small size and at low cost.

For solving these problems, the invention provides a controlling device of fuel amount in use of a solid cam so as to obtain a proper amount of fuel variable with load of an engine and its change of speed, which can control the amount of injection to fulfill the above requirements by providing said solid cam a shape of surface in the peripheral direction to meet with variation of load and a surface shape in the axial direction for the variation of speed, corresponding to the oil pressure of an oil pump (a fuel pump of ordinary engine is employed) in dependence of speed of rotation of the engine thereby controlling the fuel regulating member.

The object of this invention is to provide a fuel controlling device for an injection-type internal combustion engine, in particular, for a gasoline injection engine, which is capable of obtaining a desired amount of fuel to meet variation of load and rotary speeds of the engine without regard to the kind, use and spray characteristics of the fuel injection device, simple in construction, easy in handling, and low in cost.

Construction and operation of an embodiment of the device according to this invention will be explained by way of example in more detail with reference to the accompanying drawing in which.

Figure 3:
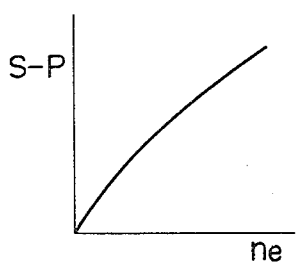
Figure 4:
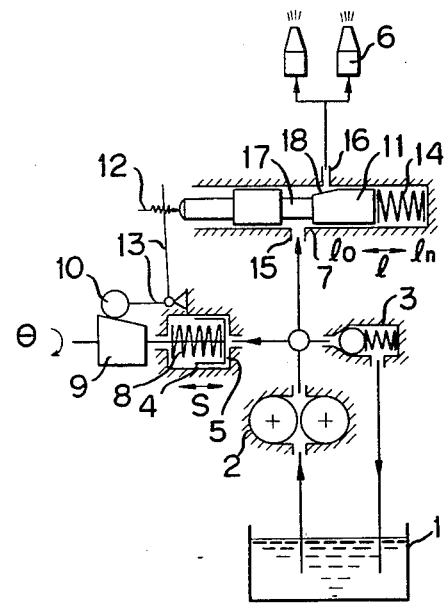
FIGURE 4 is an embodiment of this invention.

Referring now to FIGURE 4, there is a tank 1 from which oil pressure of a rotary pump 2 driven in a fixed ratio with speed of rotation of an engine not shown is adapted to be introduced to a cylinder 7 of a sleeve valve for controlling amount of fuel fed to a fuel injection nozzle 6, a pressure receiving part 5 of a power piston 4 and an overflow valve 3. There is provided a return spring 8 on the opposite side of the pressure receiving part 5 in the cylinder of the power piston 4, on the axis of which is provided a solid cam 9 to follow the reciprocal movement of the power piston 4 in the axial direction and to revolve about said axis as a centre. A cam follower 10 of the solid cam 9 engages with a connecting rod 12 at one end of the valve piston 11 of the sleeve valve through a lever 13 of the bell crank type and pressed against the solid cam 9 by a return spring 14 acting on other end of the valve piston 11. A flow inlet 15 passing from the oil pump 2 of the cylinder 7 and a flow outlet 16 to a nozzle 6 of fuel are controlled of its opening and closing by position of an annular slot 17 in the middle, said position being determined by the distance of reciprocal movement of the valve piston 11. On the surface for controlling the flow outlet 16 of the valve piston 11 is provided a notch 18 which passes to the annular slot 17. Said notch 18 consists of an inclined surface through which the cross section of the fuel flow passing the flow outlet 16 is diminished in size as the valve piston 11 moves leftwards as shown in the FIGURE 4. In this manner, oil pressure P of the fuel fed to the power piston 4 from the oil pump 2 is determined by the overflow valve 3 of a known construction having a relation directly proportional to the speed of rotation of the engine as shown in FIGURE 3. With the rise of speed of rotation of the engine or speed of rotation of the pump, the oil pressure rises so that the power piston 4 is pushed leftwards as shown in FIGURE 4 and so that the solid cam 9 in connection thereto moves in the same direction. Accordingly, the follower 10 is displaced by shape of the solid cam 9 in the axial direction to revolve the lever 13 and thus the valve piston 11 is moved similarly. Then the throttling of the notch 18 on the valve piston 11 of the flow outlet 16 varies. In order to control the amount of fuel supplied to the nozzle 6 in accord with the amount of fuel as desired in the engine, such shape of the solid cam 9 in its rotational direction may be adapted to variation of the amount of fuel which is in accord with variation of load of the engine and its shape in the axial direction may be met with variation of fuel caused from variation in the speed. According to the device, it is required to have the exhaust amount of the oil pump 2 several times larger than the exhaust amount of the nozzle 6.

Figure 1:
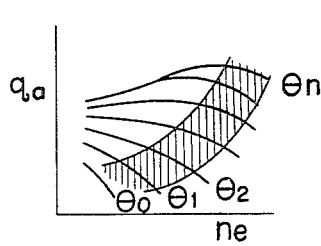
FIGURE 1 shows required characteristics of an engine.
Figure 2:
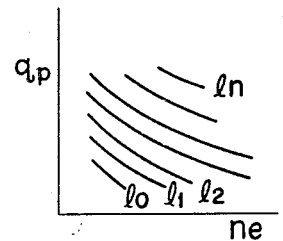
FIGURES 2 and 3 are characteristic curves of a fuel controlling device of this invention.

The shape of the solid cam 9 may be determined in the following way. FIGURE 1 shows characteristics of a fuel required for the engine to have variations in the fuel amount so as to effect a best combustion. In the FIGURE 1, $qa$ denotes amount of fuel having a load $\theta$ as parameter and $ne$ speed of rotation. In FIGURE 2 are shown characteristics of flow quantity of a sleeve valve having as parameter displacement $l$ of the valve piston 11 of the sleeve valve in the embodiment of FIGURE 4 relatively the speed of rotation $ne$ and the amount of oil $qp$. FIGURE 3 shows a relationship of displacement $S$ of the power piston 4 which is directly proportional to oil pressure $P$ of the oil pump 2 and speed of rotation $ne$. Thereby displacement $l$ of the valve piston 11 to comply with the amount of fuel $qa$ corresponding to each load $\theta_0, \theta_1 \ldots \theta_n$ of said engine as in FIGURE 1 is determined by the speed of rotation as shown in FIGURE 2 and displacement $S$ of the power piston 4 relative to $ne$ is determined as shown in FIGURE 3 so that from $l$, $S$ and the load of the cam rotation $\theta$ is determined the shape of the solid cam 9. $\theta_0$ and $\theta_n$ show respectively the maximum and the minimum values of load and $l_0$ and $l_n$ the minimum value (maximum throttling position) of displacement of the valve piston 11 and the maximum value (minimum throttling position). In the characteristic curves required for the engine shown of FIGURE 1, the most practical range is shown by oblique lines. Within range of practical application, the controlling device of this invention makes it possible to effect a proper control of fuel to meet the necessary requirements. The device can operate to decrease the amount of fuel with the rise of the speed rotation in the engine and increase the same with the fall of the speed of rotation. It is apparent that the device can serve also as a speed governor. In time of necessity to correct the temperature or atmospheric pressure, it is also possible to fulfill the requirements by shifting the point of support of the lever 13 in the axial or peripheral direction of the solid cam 9 without regard to the above operation and in response to the variation of temperature or atmospheric pressure by means of a temperature sensitive member or an atmospheric pressure member or by varying the load of a spring of the overflow valve 3 by corrective action of the member.

We claim:

1. A fuel controlling device for injection-type internal combustion engines including a sleeve valve provided in a fuel feed passage connecting the output of an oil-feed pump, with an injection nozzle, a valve piston slidable in said sleeve valve and having a notched surface portion for controlling the amount of fuel passing through said fuel feed passage to said injection nozzle in response to movement of the valve piston in the sleeve valve, a cam follower, said valve piston being connected to said cam follower, a cam, the surface of said cam varying the position of the follower upon both reciprocating and rotating movement of the cam, means mounting said cam to be reciprocally movable in response to movement of a power piston which is movable in response to the output pressure of the said oil-feed pump, said pressure being variable with the rotational speed of the engine, and wherein rotational movement of the cam corresponds to the variation of the load on the engine.

References Cited

UNITED STATES PATENTS 2,670,724   3/1954   Reggio _____ 123—140.31

FOREIGN PATENTS 989,983   4/1965   Great Britain.

LAURENCE M. GOODRIDGE, Primary Examiner

U.S. Cl. X.R.

123—139